US010277138B2

(12) United States Patent
Choi et al.

(10) Patent No.: US 10,277,138 B2
(45) Date of Patent: Apr. 30, 2019

(54) ACTIVE CLAMP FULL BRIDGE CONVERTER AND DRIVING METHOD THEREOF

(71) Applicant: Foundation of Soongsil University-Industry Cooperation, Seoul (KR)

(72) Inventors: Woojin Choi, Seoul (KR); Duong Tran Dai, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 16/071,807

(22) PCT Filed: Nov. 23, 2016

(86) PCT No.: PCT/KR2016/013510
§ 371 (c)(1),
(2) Date: Jul. 20, 2018

(87) PCT Pub. No.: WO2017/204426
PCT Pub. Date: Nov. 30, 2017

(65) Prior Publication Data
US 2019/0028035 A1 Jan. 24, 2019

(30) Foreign Application Priority Data

May 23, 2016 (KR) .................. 10-2016-0062846
Oct. 28, 2016 (KR) .................. 10-2016-0141715

(51) Int. Cl.
*H02M 3/335* (2006.01)
*H02M 1/32* (2007.01)
*H02M 1/00* (2006.01)

(52) U.S. Cl.
CPC ........ *H02M 3/33569* (2013.01); *H02M 1/32* (2013.01); *H02M 2001/0003* (2013.01); *H02M 2001/0058* (2013.01)

(58) Field of Classification Search
None
See application file for complete search history.

(56) References Cited

U.S. PATENT DOCUMENTS 7,606,051 B1 * 10/2009 Wittenbreder, Jr. ........................
H02M 3/33576
363/21.04
8,503,201 B2 * 8/2013 Reilly ................. H02M 1/34
363/125

FOREIGN PATENT DOCUMENTS

JP 2007-074781 A 3/2007
JP 2012-075210 A 4/2012
(Continued)

OTHER PUBLICATIONS

O. Deblecker et al., "Comparative Analysis of Two Zero-Current SwitchingIsolated DC-DC Converters for Auxiliary Railway Supply", 2008 International Symposium on Power Electronics, Electrical Drives, Automation and Motion, IEEE, 2008.06.11-13, pp. 1186-1193.

(Continued)

*Primary Examiner* — Henry E Lee, III
(74) *Attorney, Agent, or Firm* — Novick, Kim & Lee, PLLC; Sang Ho Lee

(57) ABSTRACT

Provided is an active clamp full bridge converter, which includes: a transformer having a primary coil and a secondary coil and configured to convert a voltage; a primary circuit connected to an input capacitor for supplying an input power and including a full bridge circuit having first to fourth switches to transmit the input power to the primary coil according to a switching operation of the first to fourth (Continued)

switches; and a secondary circuit connected to the secondary coil and including a rectifying bridge circuit having first to fourth diodes, an active clamp circuit connected to the rectifying bridge circuit and composed of an active clamp switch and a clamping capacitor connected in series, and an output inductor connected to the active clamp circuit, to transmit an energy received from the primary circuit by the transformer to an output capacitor connected to the output inductor and the active clamp circuit.

15 Claims, 17 Drawing Sheets

(56) References Cited

FOREIGN PATENT DOCUMENTS

| | | | |
|---|---|---|---|
| JP | 2014-007914 A | 1/2014 |
| JP | 2014-075928 A | 4/2014 |
| JP | 2015-033296 A | 2/2015 |

OTHER PUBLICATIONS

Y. Miura et al. "Bidirectional Isolated Dual Full-bridge dc-dc Converter with Active Clamp for ELDC". IEEE 2010.

Kwang-Soon Jung, "A study on Zero-Voltage Switching Technique for the Phase-Shieft Full Bridge Converter Employing Active Clamp Circuit and Synchronous Rectifier", Department of Secured Smart Electronic Vehicle Engineering, Graduate School Thesis, Kookmin University, Seoul Korea (English abstract at pp. 39-40).

Byung-Chul Kim et al., "Zero Voltage and Zero Current Switching Full Bridge DC-DC Converter Using Novel Secondary Active Clamp", Proceedings of KIEE General Conference and Autumn Conference. Nov. 20, 1999, pp. 13-15.

* cited by examiner

Mode 2

Mode 3

Mode 4

Mode 5

Mode 6

Mode 9

ACTIVE CLAMP FULL BRIDGE CONVERTER AND DRIVING METHOD THEREOF

TECHNICAL FIELD

This disclosure relates to an active clamp full bridge converter and a driving method thereof, and more particularly, to an active clamp full bridge converter additionally having a clamp circuit at a secondary circuit based on a transformer and a driving method thereof.

BACKGROUND ART

On-board chargers of electric vehicles (EVs) are generally equipped with AC-DC converters and DC-DC converters. The AC-DC converter converts commercial AC power to DC power, and the DC-DC converter may charge a battery in a constant-current/constant-voltage charging manner. In general, fuel efficiency is an important factor in evaluating the performance of an electric vehicle, so it is important to implement a charger that is highly efficient and compact.

For this purpose, a phase-shifting full bridge converter is most commonly used as the DC-DC converter for an on-board charger because it may achieve a zero voltage turn-off condition of primary switch elements. However, the phase-shifting full-bridge converter has problems such as a circulation current-related conduction loss, a duty cycle loss, a narrow zero voltage switching range of switch elements of a lagging leg, high voltage oscillation and reverse recovery of rectifying diodes.

Accordingly, various methods for overcoming the problems of the phase-shifting full bridge converter have been studied.

For example, a method of adding various types of auxiliary circuits to a primary circuit to extend the zero voltage switching range of switch elements has been proposed. However, this method has problems of increasing the duty cycle loss, causing an additional cost and decreasing efficiency since a large external inductor is added.

Alternatively, a method of adding a passive lossless clamp circuit to a secondary circuit to mitigate the voltage ringing of rectifying diodes and to solve problems arising from the circulating current has been proposed. A representative example of the clamp circuit is a capacitor-diode-diode (CDD) circuit in which a clamping capacitor is included in the resonance or non-resonance of a leakage inductor of the transformer. In this case, the primary current of the transformer may be reset during a freewheeling period. However, the switch elements provided at a leading leg of the primary side have a problem of being turned on under the hard switching condition.

Alternatively, a method of adding an active clamp circuit to a secondary circuit so as to achieve a zero-voltage/zero-current switching condition of primary switch elements has been proposed. In this case, by properly controlling the clamp switch, it is possible to turn on the zero voltage switching of the switch elements provided at the leading leg and turn off the zero current switching of the switch elements provided at the lagging leg. However, there is a problem that soft switching of the clamp switch is impossible.

Alternatively, a method of adding an active energy recovery clamp and an auxiliary circuit for suppressing the circulating current to a secondary circuit has been proposed. However, this method requires a large number of additional elements, which gives complexity in implementing, thereby reducing the stability and efficiency of the converter.

In addition, a phase-shifting full-bridge converter including a voltage-doubler-type rectifier has been proposed as a method using rectification between a leakage inductor and a secondary rectifying capacitor for energy transfer. However, this method also has problems in that the current stress of the rectifying diodes is large, the circulating current is incompletely removed, and the condition for achieving zero current switching of the primary switch elements is dependent on the load current. Thus, this method is mainly applied to high-voltage and low-current devices.

DISCLOSURE

Technical Problem

This disclosure is directed to providing an active clamp full bridge converter in which a clamp circuit composed of an active clamp switch and a clamping capacitor are added to a secondary circuit based on a transformer, and a driving method thereof.

Technical Solution

In one general aspect, there is provided an active clamp full bridge converter, comprising: a transformer having a primary coil and a secondary coil and configured to convert a voltage; a primary circuit connected to an input capacitor for supplying an input power and including a full bridge circuit having first to fourth switches to transmit the input power to the primary coil according to a switching operation of the first to fourth switches; and a secondary circuit connected to the secondary coil and including a rectifying bridge circuit having first to fourth diodes, an active clamp circuit connected to the rectifying bridge circuit and composed of an active clamp switch and a clamping capacitor connected in series, and an output inductor connected to the active clamp circuit, to transmit an energy received from the primary circuit by the transformer to an output capacitor connected to the output inductor and the active clamp circuit.

Meanwhile, the secondary circuit may include an active clamp circuit composed of a clamping capacitor that performs resonance between the active clamp switch and leakage inductance of the transformer.

In addition, in the secondary circuit, the first to fourth diodes may be provided on a pair of legs connected in parallel, one end of the active clamp switch may be connected to an upper contact point of the pair of legs, one end of the clamping capacitor may be connected to the other end of the active clamp switch, and the other end the clamping capacitor may be connected to a lower contact point of the pair of legs.

In addition, the secondary circuit may include the active clamp switch for operating a turn-on operation so as to delay the resonance between the clamping capacitor and the leakage inductance of the transformer for a predetermined period.

In addition, the secondary circuit may include the active clamp switch for operating a turn-on operation so as to reset a primary current output from the primary circuit in a freewheeling region.

In addition, the primary circuit may output a primary circuit having a quasi-sinusoidal waveform.

In addition, the primary circuit may include a first leg and a second leg connected in parallel, the first to fourth switches may be provided on the first leg and the second leg, a leakage inductor and a magnetizing inductor may be provided on an input voltage line connecting the first leg and the second leg, and the magnetizing inductor may be connected to the primary coil in parallel.

In addition, in the secondary circuit, when the active clamp switch is turned on, the energy stored in the clamping capacitor may be discharged to the output capacitor through the active clamp switch.

Meanwhile, in another aspect of the present disclosure, there is also provided a driving method of an active clamp full bridge converter, which converts a voltage between an input capacitor for supplying an input power and an output capacitor connected to an output load resistor in parallel, a primary circuit connected to the input capacitor including a full bridge circuit having first to fourth switches, a secondary circuit connected to the output capacitor including a rectifying bridge circuit, an active clamp circuit connected to the rectifying bridge circuit and composed of an active clamp switch and a clamping capacitor connected in series and an output inductor connected to the active clamp circuit, a transformer being provided between the primary circuit and the secondary circuit to convert a voltage, wherein in the primary circuit, a first switch and a second switch provided at the same leg of a full bridge circuit are controlled to turn on or turn off contrary to each other and a third switch and a fourth switch are controlled to turn on or turn off contrary to each other to transmit the input power to the transformer, and wherein in the secondary circuit, when a zero current switching turn-on condition is accomplished in a state all switches provided on a diagonal line of the full bridge circuit are turned on, the active clamp switch is controlled to turn on, and the energy stored in the clamping capacitor is transmitted to the output capacitor.

Meanwhile, before a switching cycle of the first to fourth switches and the active clamp switch starts, in the secondary circuit, all the first to fourth diodes may operate to form a conduction path for a reflection current of the output inductor.

In addition, the switching cycle may include a dead time that satisfies a predetermined condition for accomplishing a soft switching condition of the first to fourth switches.

In addition, the first to fourth switches may perform a turn-on operation under a zero voltage switching condition.

In addition, the first to fourth switches may perform a turn-off operation under a zero current switching condition.

In addition, when the first diode and the fourth diode are biased in a forward direction, the resonance between leakage inductance of the transformer and the clamping capacitor may start.

In addition, when the clamping capacitor is charged to a maximum value, a rectifying voltage of the rectifying bridge circuit may be clamped by the maximum voltage of the clamping capacitor.

Advantageous Effects

According to an embodiment of the present disclosure, the convertor of the present disclosure has characteristics of a quasi-resonance half-wave converter to achieve the soft switching condition of the switch elements provided at the primary full bridge circuit, to eliminate the circulating current in a freewheeling region to remove resultant loss, to solve the reverse recovery problem of the rectifying diodes, and to remove voltage ringing to ensure high efficiency as a whole.

REFERENCE SIGNS

Figure 1:
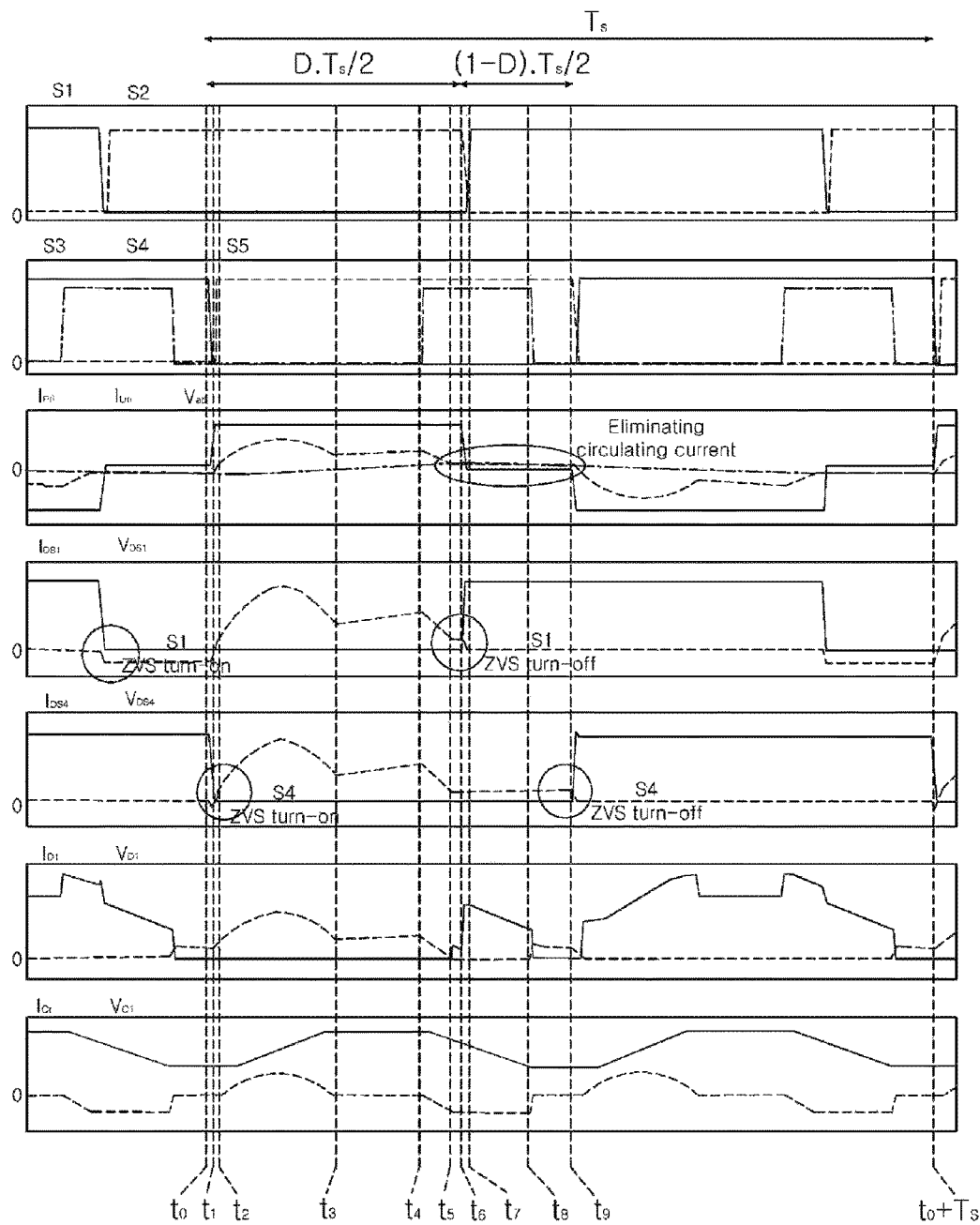
FIG. 1 is a diagram showing a main waveform of an active clamp full bridge converter according to an embodiment of the present disclosure.

100: active clamp full bridge converter
110: transformer
120: primary circuit
130: secondary circuit

BEST MODE

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

Hereinafter, preferred embodiments of the present disclosure will be described in more detail with reference to the drawings.

Figure 2:
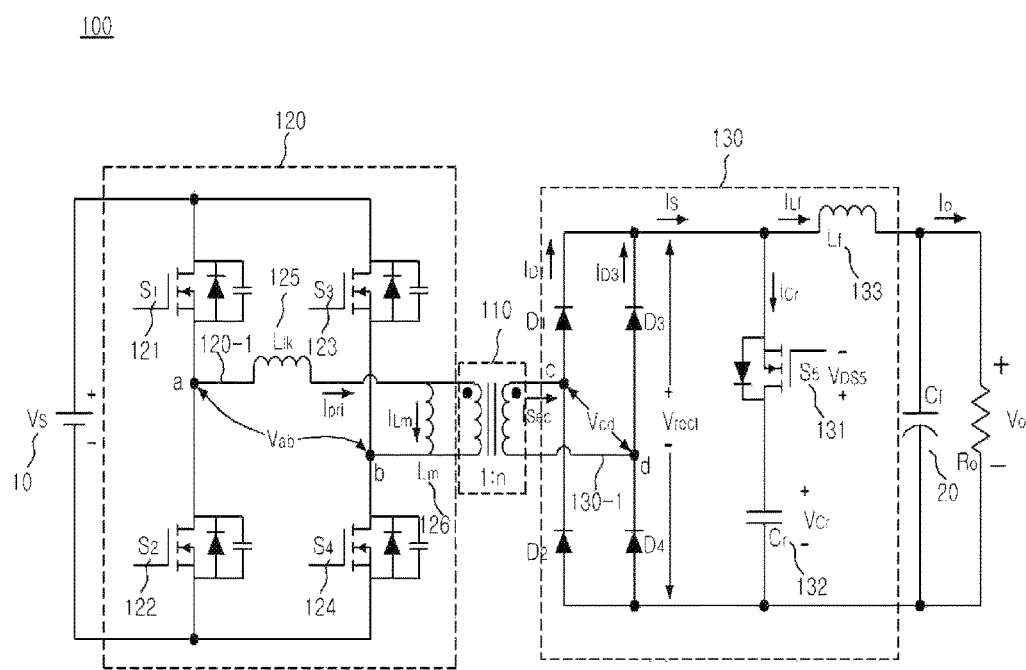
FIG. 2 is a schematic circuit diagram showing the active clamp full bridge converter according to an embodiment of the present disclosure.

FIG. 1 is a diagram showing a main waveform of an active clamp full bridge converter according to an embodiment of the present disclosure, and FIG. 2 is a schematic circuit diagram showing the active clamp full bridge converter according to an embodiment of the present disclosure.

Referring to FIG. 2, an active clamp full bridge converter 100 according to an embodiment of the present disclosure is a DC-DC converter, which converts a voltage between a primary circuit 120 connected to an input terminal and a secondary circuit 130 connected to an output terminal based on a transformer 110. In particular, the secondary circuit includes an active clamp circuit composed of an active clamp switch 131 and a clamping capacitor 132 for performing resonance between the active clamp switch 131 and leakage inductance of the transformer 110. Also, the active clamp full bridge converter 100 may accomplish zero voltage switching turn-on of switch elements provided at the first circuit, accomplish turn-off under an almost zero current switching condition, and reset the primary current in a freewheeling region. In addition, the active clamp full bridge converter 100 may accomplish zero current switching turn-off of rectifying diodes provided at the secondary circuit to eliminate the reverse recovery problem of the rectifying diodes, and at this time, the active clamp switch 131 may also accomplish zero current switching turn-on.

Here, as shown in FIG. 1, a primary current $I_{pri}$ of the active clamp full bridge converter 100 according to an embodiment of the present disclosure has a quasi-sinusoidal waveform, and thus the active clamp full bridge converter 100 may be called a quasi-resonant half-wave converter.

Hereinafter, each component of the active clamp full bridge converter 100 according to an embodiment of the present disclosure as shown in FIG. 2 will be described in detail.

First, the transformer 110 may convert the voltage of the primary circuit 120 according to a predetermined turn ratio of 1:n and transmit the converted voltage to the secondary circuit 130. That is, the transformer 110 is composed of a primary coil and a secondary coil magnetically coupled at a turn ratio of 1:n. The primary coil may be connected to the primary circuit 120, and the secondary coil may be connected to the secondary circuit 130.

The primary circuit may include a full bridge circuit having a first switch 121 to a fourth switch 124. At this time, the full bridge circuit is connected to an input capacitor 10, and a leakage inductor 125 and a magnetizing inductor 126 of the transformer 110 may be provided on an input voltage line 120-1 connecting a pair of legs of the full bridge circuit. Here, the magnetizing inductor 126 may be connected in parallel with the primary coil of the transformer 110.

Specifically, the full bridge circuit included in the primary circuit 120 may include a first leg and a second leg connected in parallel. The first switch 121 and the second switch 122 may be provided on the first leg, and the third switch 123 and the fourth switch 124 may be provided on the second leg. At this time, the first switch 121 to the fourth switch 124 may be MOSFET switches, for example, and a body diode and a parasitic capacitor may be connected and added thereto in parallel.

In addition, an upper contact point and a lower contact point of the first leg and the second leg may be connected to both ends of the input capacitor 10, respectively, and the leakage inductor 125 and the magnetizing inductor 126 of the transformer 110 may be provided on the input voltage line 120-1 that connects a first contact point (a) between the first switch 121 and the second switch 122 at the first leg and a second contact point (b) between the third switch 123 and the fourth switch 124 at the second leg.

The primary circuit 120 as described above may transmit the voltage of the input capacitor 10 to the transformer 110 according to a switching operation of the first switch 121 to the fourth switch 124. At this time, the first switch 121 to the fourth switch 124 may be controlled in a phase-shift manner, and the output voltage may be adjusted by controlling the first switch 121 to the fourth switch 124 as described above.

The secondary circuit 130 may include a full bridge circuit having a first diode $D_1$ to a fourth diode $D_4$, namely a rectifying bridge circuit, and may include an active clamp circuit connected between the rectifying bridge circuit and the output capacitor 20. At this time, the output capacitor 20 may be connected in parallel with an output load resistor $R_o$, and the secondary coil of the transformer 110 may be provided on an output voltage line 130-1 that connects the pair of legs of the rectifying bridge circuit.

Specifically, the rectifying bridge circuit included in the secondary circuit 130 may be composed of a third leg and a fourth leg connected in parallel. Here, the first diode $D_1$ and the second diode $D_2$ may be provided on the third leg, and the third diode $D_3$ and the fourth diode $D_4$ may be provided on the fourth leg. At this time, the secondary coil of the transformer 110 is provided on the output voltage line 130-1 connecting the third leg and the fourth leg, and the rectifying bridge circuit may rectify the energy transferred from the primary coil of the transformer 110 to the secondary coil.

In addition, the active clamp circuit included in the secondary circuit 130 may include the active clamp switch 131 and the clamping capacitor 132 connected in series. The active clamp circuit may be connected to the upper contact point and the lower contact point of the third leg and the fourth leg of the rectifying bridge circuit, respectively. That is, one end of the active clamp switch 131 may be connected to the upper contact point of the third leg and the fourth leg, the other end of the active clamp switch 131 is connected to one end of the clamping capacitor 132, and the other end of the clamping capacitor 132 may be connected to the lower contact point of the third leg and the fourth leg. At this time, the active clamp switch 131 may be a MOSFET switch, for example, and a body diode and a parasitic capacitor may be connected and added thereto in parallel.

Here, an operation characteristic of each component of the active clamp circuit will be described briefly. First, the clamping capacitor 132 performs a resonance with the leakage inductance $L_{lk}$ of the transformer 110, so that the primary current $I_{pri}$ may represent a quasi-sinusoidal waveform. In addition, the active clamp switch 131 may delay the resonance between the clamping capacitor 132 and the leakage inductance $L_{lk}$ of the transformer 110 for a predetermined period, perform a turn-on operation so that the primary current may be reset in a freewheeling region, and as a result accomplish the zero current switching turn-off condition of the switch elements provided at the primary circuit 120.

In addition, the secondary circuit 130 may further include an output inductor 133 coupled to the active clamp circuit. One end of the output inductor 133 may be connected to one end of the active clamp switch 131, namely the upper contact point of the third leg and the fourth leg, and the other end of the output inductor 133 may be connected to one end of the output capacitor 20. At this time, the other end of the output capacitor 20 may be connected to the other end of the clamping capacitor 132, namely the lower contact point of the third leg and the fourth leg.

The secondary circuit 130 as described above rectifies the output energy by the first diode $D_1$ to the fourth diode $D_4$ and also further includes the clamping capacitor 132 and the active clamp switch 131 to enhance the efficiency of the active clamp full bridge converter 100 according to an embodiment of the present disclosure.

In other words, the active clamp full bridge converter 100 according to an embodiment of the present disclosure may ensure zero voltage switching turn-on of the switch elements provided at the primary circuit 120 and turn-off under an almost zero current switching condition over the entire load range by the active clamp circuit added to the secondary circuit 130. In addition, the active clamp full bridge converter 100 may remove the circulating current in the freewheeling region to eliminate the associated losses. In addition, there is no reverse recovery of the rectifying diodes provided at the secondary circuit 130, and the voltage ringing may be eliminated. Moreover, high efficiency is exhibited over the entire load range due to a small duty cycle loss.

Hereinafter, a driving method of the active clamp full bridge converter 100 according to an embodiment of the present disclosure to have the above characteristics will be described.

First, for convenience of explanation, output filter inductance is assumed to have a large value, an ideal current source may be regarded as $I_o$, and parameters of the circuit may be defined as follows.

The characteristic impedance may be defined as in Equation 1 below.

$$Z_r = \sqrt{\frac{n^2 L_{lk}}{C_r}} \quad \text{[Equation 1]}$$

In Equation 1, n represents a turn ratio of the transformer 110, $L_{lk}$ represents leakage inductance of the transformer 110, and $C_r$ represents capacitance of the clamping capacitor 132.

In addition, the resonant angular frequency may be defined as in Equation 2 below.

$$\omega_r = \frac{1}{\sqrt{n^2 L_{lk} C_r}} \quad \text{[Equation 2]}$$

In Equation 2, n represents a turn ratio of the transformer 110, $L_{lk}$ represents leakage inductance of the transformer 110, and $C_r$ represents capacitance of the clamping capacitor 132.

In addition, the resonance frequency may be defined as in Equation 3 below.

$$f_r = \frac{\omega_r}{2\pi} \quad \text{[Equation 3]}$$

In Equation 3, $\omega_r$ represents a resonant angular frequency.

In addition, the switching cycle may be defined as $T_s$, and the switching frequency may be defined as $f_s$.

Hereinafter, a driving method of the active clamp full bridge converter 100 according to an embodiment of the present disclosure in plurality of operation modes during a half of the switching cycle ($T_s$) will be described in detail with reference to FIGS. 1 and FIGS. 3A to 3J.

FIGS. 3A to 3J are schematic circuit diagrams for illustrating a driving method in each operation mode of the active clamp full bridge converter according to an embodiment of the present disclosure.

Figure 3A:
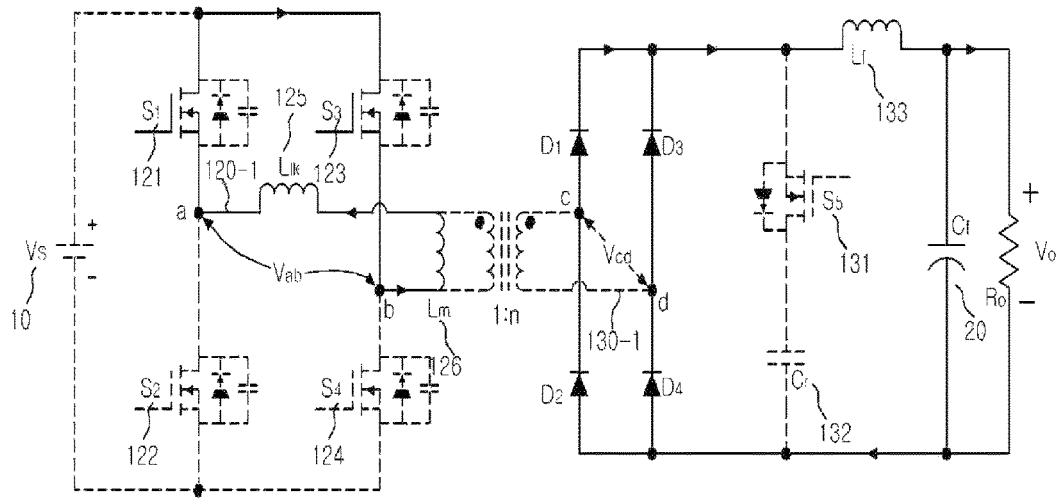
FIGS. 3A to 3J are schematic circuit diagrams for illustrating a driving method in each operation mode of the active clamp full bridge converter according to an embodiment of the present disclosure.

First, referring to FIG. 3A, in a zeroth operation mode before to when the switching cycle $T_s$ starts, in the primary circuit 120, the first switch 121 and the third switch 123 are in a turn-on state during the freewheeling region, and a magnetizing current $I_{Lm}$ may flow. In addition, in the secondary circuit 130, all the first diode $D_1$ to the fourth diode $D_4$ may operate to form a conduction path for a reflection current $I_{Lf}$ of the output inductor 133. Accordingly, Equations 4 and 5 below may be derived.

$$i_{D1} = i_{D3} = \frac{i_{Lf}}{2} \quad \text{[Equation 4]}$$

In Equation 4, $i_{D1}$ and $i_{D3}$ represent currents flowing in the first diode $D_1$ and the third diode $D_3$, respectively, and $i_{Lf}$ represents a reflection current of the output inductor 133.

$$I_{Sec} = 0 \quad \text{[Equation 5]}$$

In Equation 5, $I_{Sec}$ represents a current flowing in the secondary coil of the transformer 110.

Figure 3B:
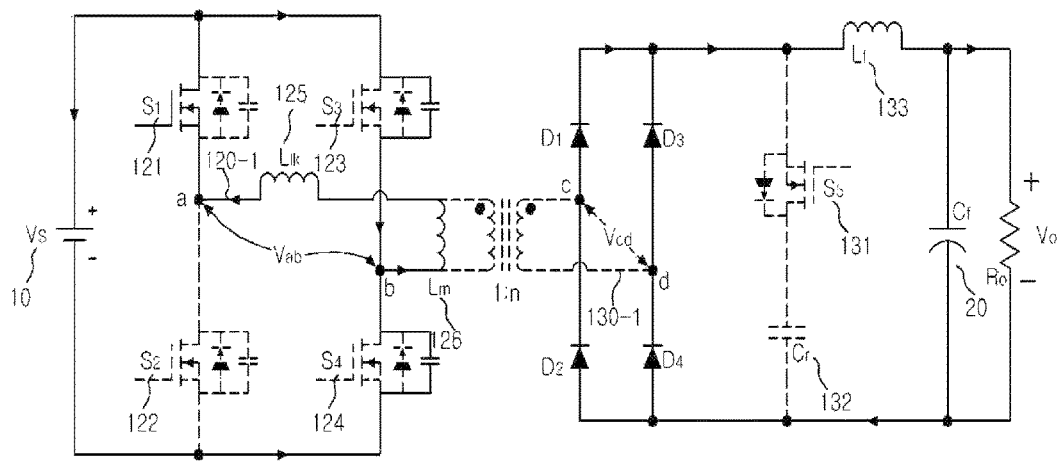

After that, referring to FIG. 3B, in a first operation mode ($t_0$ to $t_1$), at the primary circuit 120, the third switch 123 may be turned off at to, and the magnetizing current $I_{Lm}$ may charge a parasitic capacitor $C_{oss3}$ added to the third switch 123 and discharge a parasitic capacitor $C_{oss4}$ added to the fourth switch 124. At this time, if the parasitic capacitor $C_{oss4}$ added to the fourth switch 124 is completely discharged, the voltage $V_{DS4}$ applied to the fourth switch 124 becomes 0, and the body diode added to the fourth switch 124 may be biased in a forward direction. As described above, as the voltage $V_{DS4}$ applied to the fourth switch 124 becomes 0, the fourth switch 124 may accomplish the zero voltage switching turn-on condition. Here, in order to accomplish the zero voltage switching condition of the fourth switch 124 provided at the second leg of the full bridge circuit, namely a lagging leg, the energy $E_{Lm\_t0}$ stored in the magnetizing inductor 126 should be able to satisfy Equation 6 below.

$$E_{Lm\_t0} = \tfrac{1}{2} L_m I_{Lm}^2(t_0) \geq \tfrac{1}{2}(2C_{oss})V_s^2 \quad \text{[Equation 6]}$$

In Equation 6, $L_m$ represents inductance of the magnetizing inductor 126, $I_{Lm}$ represents a magnetizing current at to, $C_{oss}$ represents capacitance of the parasitic capacitor added to the switch element, and $V_s$ represents an input voltage.

In addition, in order to accomplish the zero voltage switching condition of the switch elements provided at the lagging leg, a minimum dead time according to Equations 7 and 8 below is demanded.

$$|I_{Lm}(t_0)| = 2C_{oss}\frac{dV_s}{dt} \quad \text{[Equation 7]}$$

$$\Delta t_1 = t_1 - t_0 = t_{dead} = 2C_{oss}\frac{V_s}{|I_{Lm}(t_0)|} \quad \text{[Equation 8]}$$

In Equations 7 and 8, $C_{oss}$ represents capacitance of the parasitic capacitor added to the switch element, and $V_s$ represents an input voltage.

Figure 3C:
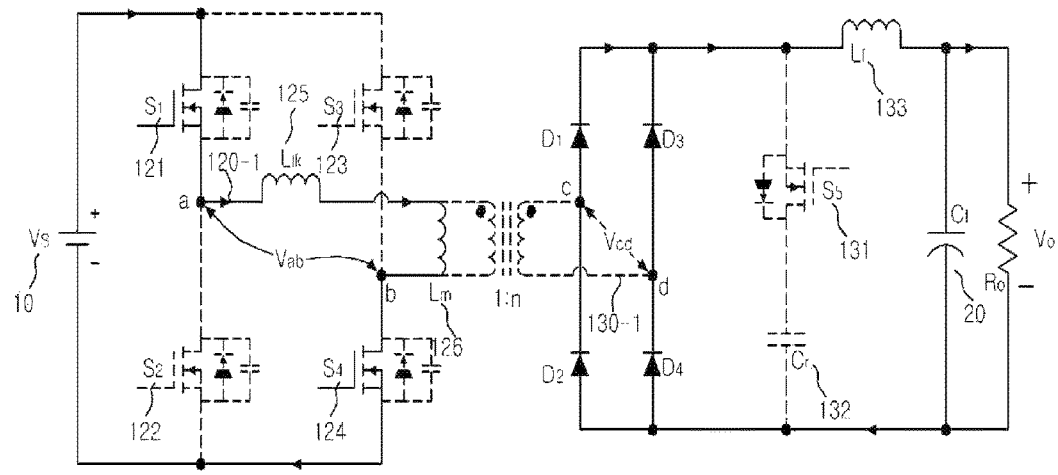

After that, referring to FIG. 3C, in a second operation mode ($t_1$ to $t_2$), at the primary circuit 120, the fourth switch 124 may be turned on under a zero voltage switching condition at $t_1$. In addition, the input voltage $V_s$ may be applied to the leakage inductance $L_{lk}$ of the transformer 110. At this time, the primary current $I_{pri}$ is still lower than the reflection current $I_{Lf}$ of the output inductor 133 and may linearly increase along a slope as in Equation 9 below.

$$\frac{dI_{Pri}(t)}{dt} = \frac{V_s}{L_{lk}} \quad \text{[Equation 9]}$$

In Equation 9, $V_s$ represents an input voltage, and $L_{lk}$ represents leakage inductance of the transformer 110.

Here, the magnetizing current $I_{Lm}$ may increase or decrease according to Equation 10 below.

$$I_{Lm}(t) = I_{Lm}(t_1) + \frac{V_s}{L_m}(t - t_1) \quad \text{[Equation 10]}$$

In Equation 10, $V_s$ represents an input voltage, and $L_m$ represents inductance of the magnetizing inductor 126.

The second operation mode as described above may end if the primary current $I_{pri}$ reaches a reflected output current $I_o$. Thus, the time interval of the second operation mode may be expressed as in Equation 11 below.

$$\Delta t_2 = t_2 - t_1 = \frac{L_{lk}(nI_O)}{V_s} \quad \text{[Equation 11]}$$

In Equation 11, $L_{lk}$ represents leakage inductance of the transformer 110, n represents a turn ratio of the transformer 110, $I_o$ represents a reflected output current, and $V_s$ represents an input voltage.

Figure 3D:
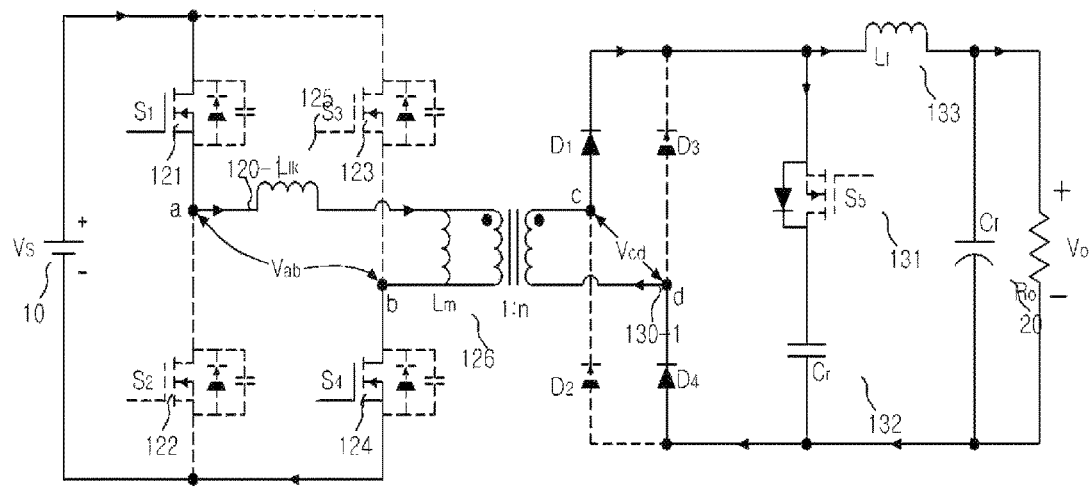

After that, referring to FIG. 3D, in a third operation mode ($t_2$ to $t_3$), at the secondary circuit 130, the first diode $D_1$ and the fourth diode $D_4$ may be biased in a forward direction at $t_2$ when the primary current $I_{pri}$ reaches the reflected output current $I_{Lf}$. In addition, resonance between the leakage inductance $L_{lk}$ of the transformer 110 and the capacitance $C_r$ of the clamping capacitor 132 may start. At this time, the primary current $I_{pri}$ is a sum of the resonance current and a PWM current $I_{Lf}$ reflected to the primary circuit and may be expressed as in Equation 12 below.

$$I_{Pri}(t) = \frac{1}{n}[nV_s - V_{Cr}(t_2)]\frac{1}{Z_r}\sin\omega_r(t - t_2) + nI_O + I_{Lm}(t) \quad \text{[Equation 12]}$$

In Equation 12, n represents a turn ratio of the transformer, $V_s$ represents an input voltage, $V_{Cr}$ represents a voltage applied to the clamping capacitor 132, $Z_r$ represents characteristic impedance, $I_{Lm}$ represents a magnetizing current, $\omega_r$ represents a resonant angular frequency, and $I_o$ represents a reflected output current.

The third operation mode may end at $t_3$ when the current $I_{Cr}$ of the clamping capacitor 132 decreases to 0. At this time, in the case of $\omega_r(t_3-t_2)=\pi$, the voltage $V_{Cr}$ applied to the clamping capacitor 132 may be a peak voltage.

$$V_{Cr}(t_3-t_2)=2[nV_s-V_{Cr}(t_2)]+V_{Cr}(t_2) \quad \text{[Equation 13]}$$

According to Equation 13, in the case of $V_{Cr}(t_2)=V_{Cr}(t_8)=0$, the maximum voltage applied to the clamping capacitor 132 may reach $2nV_s$. Accordingly, the time interval of the third operation mode may be expressed as in Equation 14 below.

$$\Delta t_3 = t_3 - t_2 = \frac{\pi}{\omega_r} \quad \text{[Equation 14]}$$

In Equation 14, $\omega_r$ represents a resonant angular frequency.

Figure 3E:
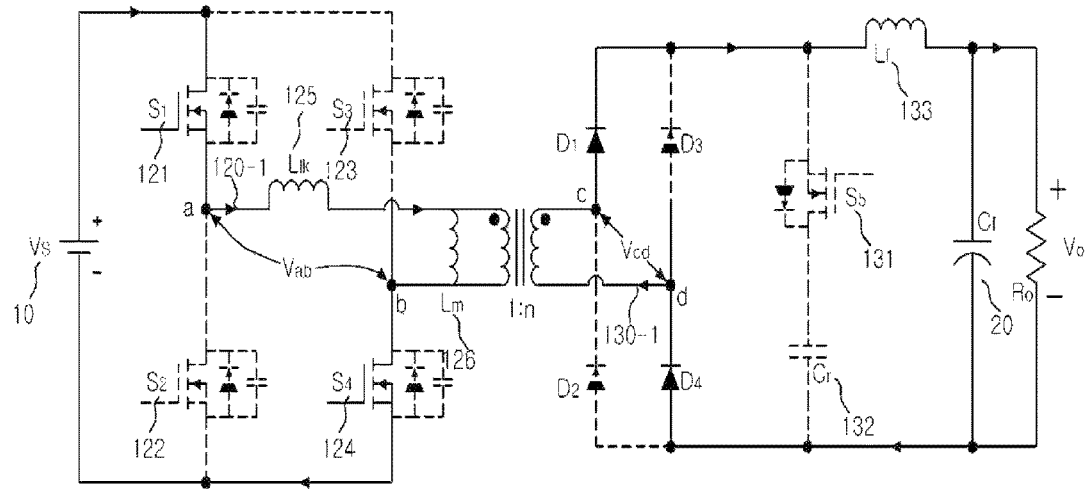

After that, referring to FIG. 3E, in the fourth operation mode ($t_3$ to $t_4$), the resonance is completed in half at $t_3$, and thus the primary current may be equal to the reflection current of the output inductor 133. At this time, the clamping capacitor 132 may be charged with a maximum value, and this value may be maintained during the fourth operation mode. Here, the rectifying voltage $V_{rect}$ may be clamped as in Equation 15 below.

$$V_{rect}=V_{Cr}-V_{DSS} \quad \text{[Equation 15]}$$

The fourth operation mode may end when the active clamp switch 131 is turned on.

Figure 3F:
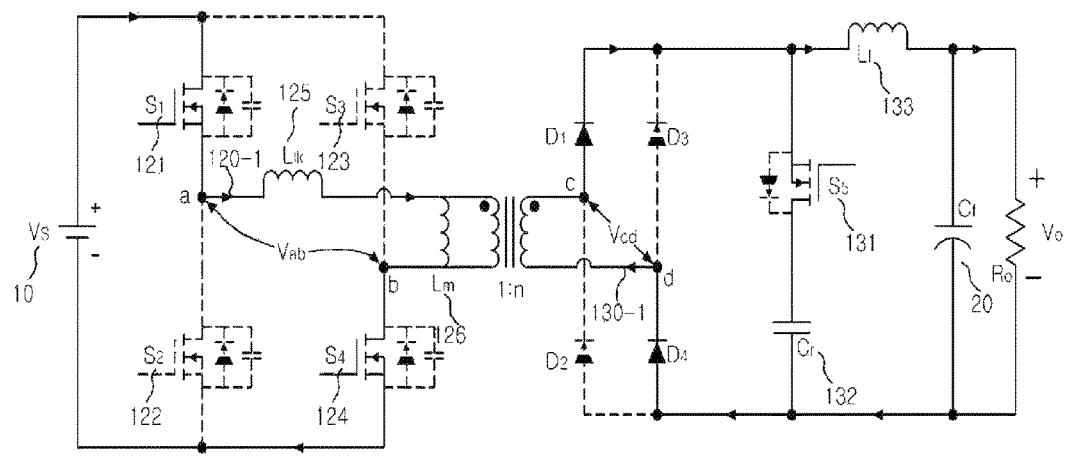

After that, referring to FIG. 3F, in a fifth operation mode ($t_4$ to $t_5$), the active clamp switch 131 may perform zero current switching turn-on, and the energy of the clamping capacitor 132 may be discharged to an output terminal through the active clamp switch 131. At this time, the primary current $I_{pri}$ may rapidly decrease and its magnitude may be equal to the magnetizing current of the transformer 110 at $t_5$, which means that the secondary current $I_{sec}$ also decreases to 0. The secondary current $I_{sec}$ may be expressed as in Equation 16 below.

$$I_{sec}(t) = I_O - \frac{\Delta V_{Cr}}{Z_r}\sin\omega_r(t - t_4) \quad \text{[Equation 16]}$$

At this time, in the case of $t=t_5$, $I_{sec}$ becomes 0, and thus Equation 16 may be expressed as in Equation 17 below.

$$I_O - \frac{\Delta V_{Cr}}{Z_r}\sin\omega_r(t_5 - t_4) = 0 \quad \text{[Equation 17]}$$

Accordingly, the time interval of the fifth operation mode may be expressed as in Equation 18 below.

$$\Delta t_5 = t_5 - t_4 = \frac{1}{\omega_r}\left[\sin^{-1}\left(\frac{I_O Z_r}{\Delta V_{Cr}}\right)\right] \quad \text{[Equation 18]}$$

In Equation 18, $\omega_r$ represents a resonant angular frequency, $I_o$ represents a reflected output current, $Z_r$ represents characteristic impedance, and $V_{Cr}$ represents a voltage applied to the clamping capacitor 132.

Here, from Equation 17, it may be found that a load current for satisfying the zero current switching condition, namely a reflected output current, should satisfy Equation 19 below.

$$I_O < \frac{\Delta V_{Cr}}{Z_r} \quad \text{[Equation 19]}$$

Figure 3G:
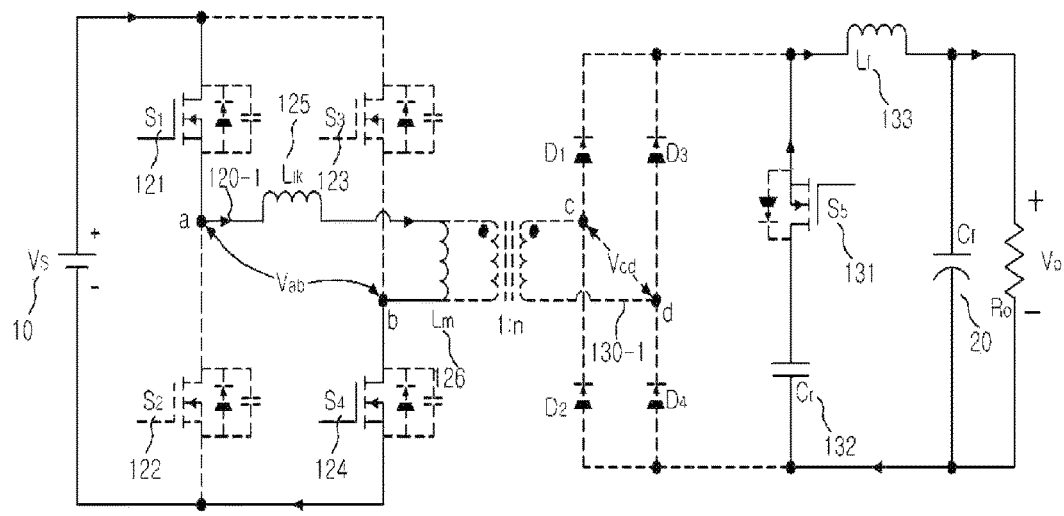

After that, referring to FIG. 3G, in a sixth operation mode ($t_5$ to $t_6$), at the primary circuit 120, the first switch 121 and the fourth switch 124 are still in a turn-on state, but only a small magnetizing current flows, because the rectifying diodes of the secondary circuit 130 are biased in a reverse direction by the clamping capacitor 132. Thus, the first switch 121 may be turned off under an almost zero current switching condition at $t_6$.

In addition, at the secondary circuit 130, the energy stored in the clamping capacitor 132 and the output inductor 133 may be transmitted to an output load $R_o$.

Figure 3H:
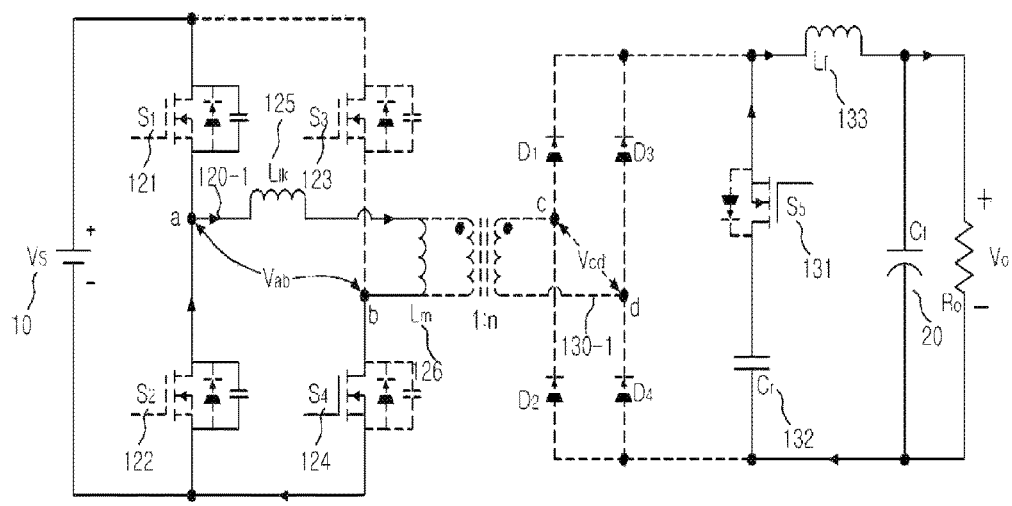

After that, referring to FIG. 3H, in a seventh operation mode ($t_6$ to $t_7$), at the primary circuit 120, the first switch 121 is turned off at $t_6$, and thus the primary magnetizing current may charge and discharge the output capacitors of the first switch 121 and the second switch 122, respectively. Thus, the body diode of the second switch 122 operates, and the second switch 122 may be turned on under the zero voltage switching condition.

The time interval of the seventh operation mode is identical to the time interval of the first operation mode and is resultantly equal to the dead time as in Equation 20 below.

$$\Delta t_7 = \Delta t_1 = t_{dead} \quad \text{[Equation 20]}$$

Figure 3I:
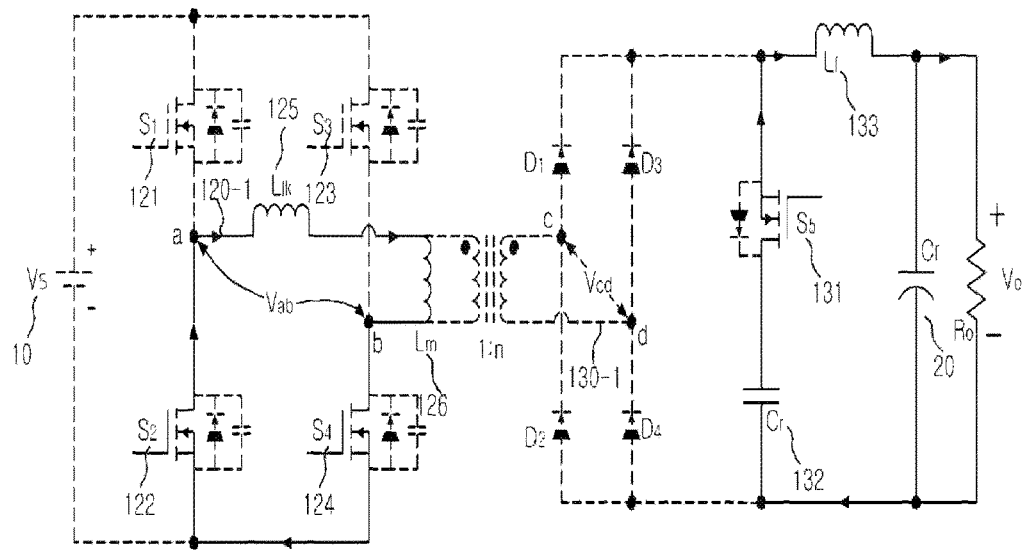

After that, referring to FIG. 3I, in an eighth operation mode ($t_7$ to $t_8$), at the secondary circuit 130, the active clamp switch 131 is still in a turn-on state, and thus the discharge current of the clamping capacitor 132 may be equal to the reflected output current ($I_o$), namely the load current.

The eighth operation mode may end at $t_8$ when the active clamp switch 131 is turned off, and its time interval is as in Equation 21 below.

$$\Delta t_8 = t_8 - t_7 = \frac{C_r}{I_o}[nV_s - V_{Cr}(t_8)] \quad \text{[Equation 21]}$$

In Equation 21, $C_r$ represents capacitance of the clamping capacitor 132, $I_o$ represents a reflected output current, n represents a turn ratio of the transformer, $V_s$ represents an input voltage, and $V_{Cr}$ represents a voltage applied to the clamping capacitor 132.

Figure 3J:
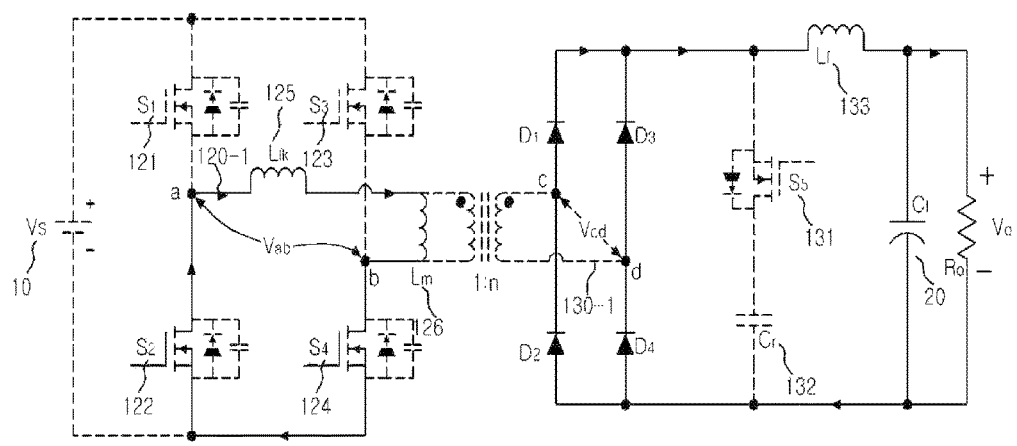

Finally, referring to FIG. 3J, in a ninth operation mode ($t_8$ to $t_9$), at the secondary circuit 130, if the active clamp switch 131 is turned off at $t_8$, the current $I_{Lf}$ of the output inductor 133 may flow through the first diode $D_1$ to the fourth diode $D_4$. Thus, the voltage applied to the first diode $D_1$ to the fourth diode $D_4$ may become 0. In other words, the secondary circuit 130 may operate similarly to the zeroth operation mode.

Here, at the primary circuit 120, only a small magnetizing current $I_{Lm}$ flows, and it may be found that the circulating current does not flow.

Hereinafter, the operation characteristics of the active clamp full bridge converter 100 according to an embodiment of the present disclosure in the above operation modes will be described.

Figure 4:
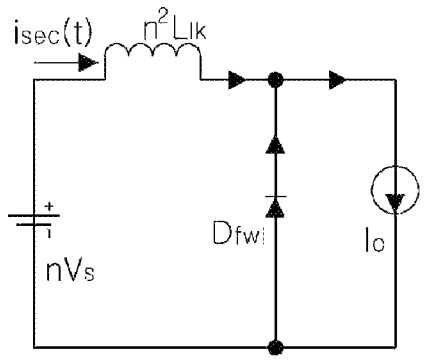
FIG. 4 is an equivalent circuit diagram of the active clamp full bridge converter according to an embodiment of the present disclosure in each operation mode depicted in FIGS. 3A to 3J.
Figure 4:
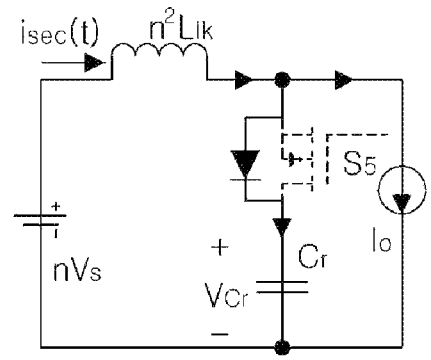
Figure 4:
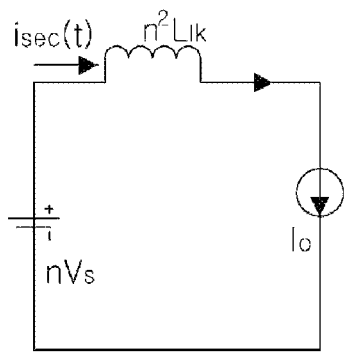
Figure 4:
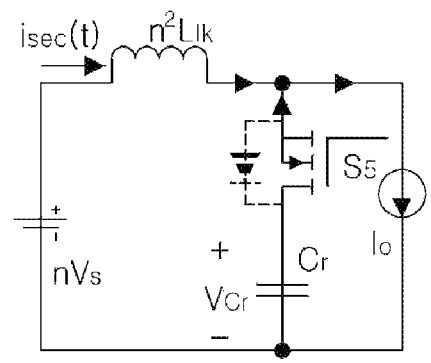
Figure 4:
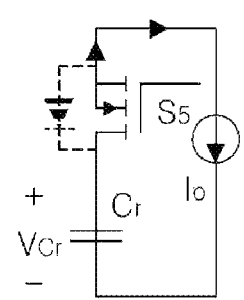
Figure 4:
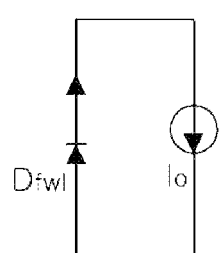
Figure 5:
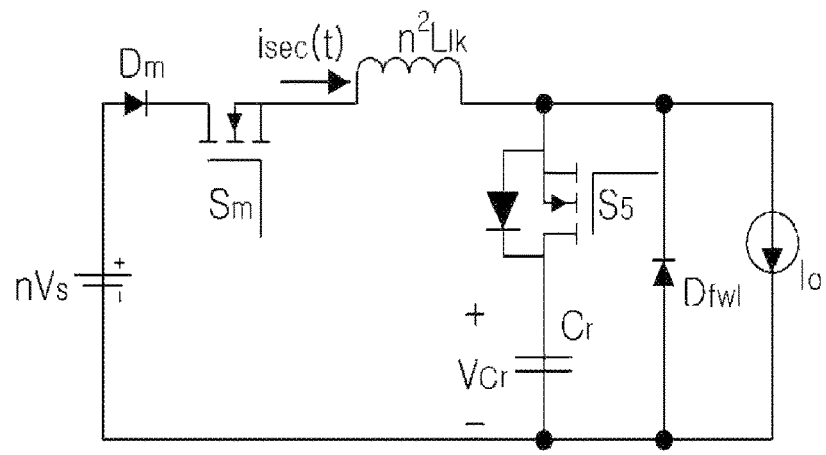
FIG. 5 is a diagram simply showing the active clamp full bridge converter according to an embodiment of the present disclosure.
Figure 6:
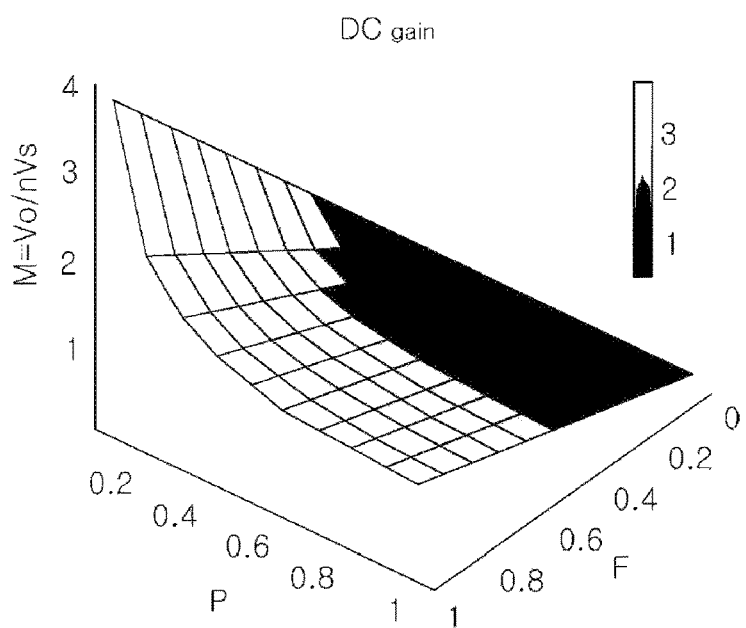
FIGS. 6 and 7 are graphs showing examples of calculating a voltage gain of the active clamp full bridge converter according to an embodiment of the present disclosure.
Figure 7:
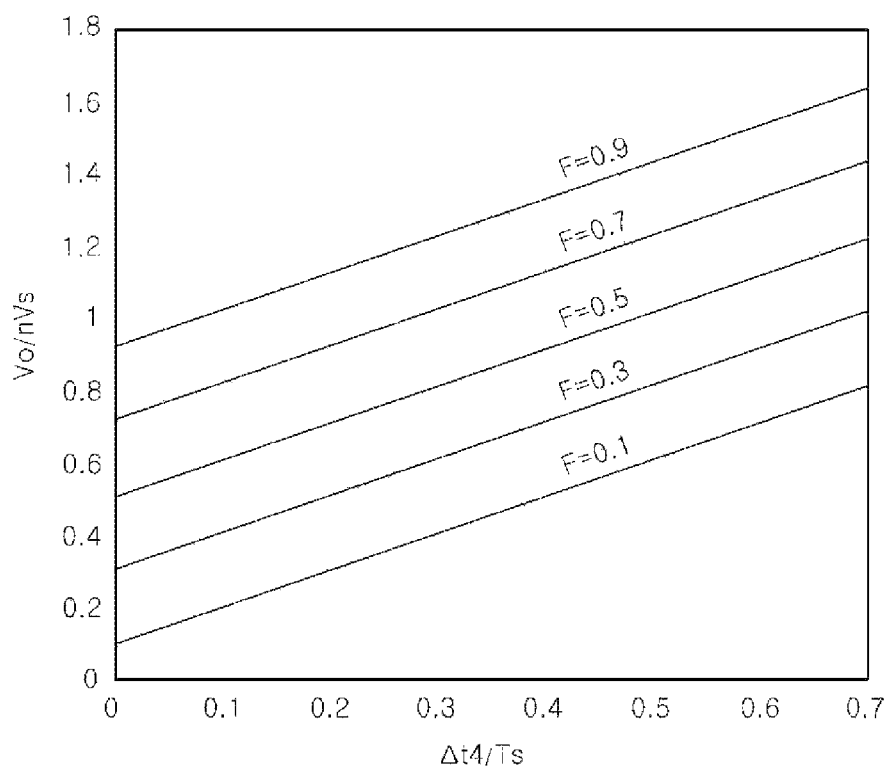
Figure 8:
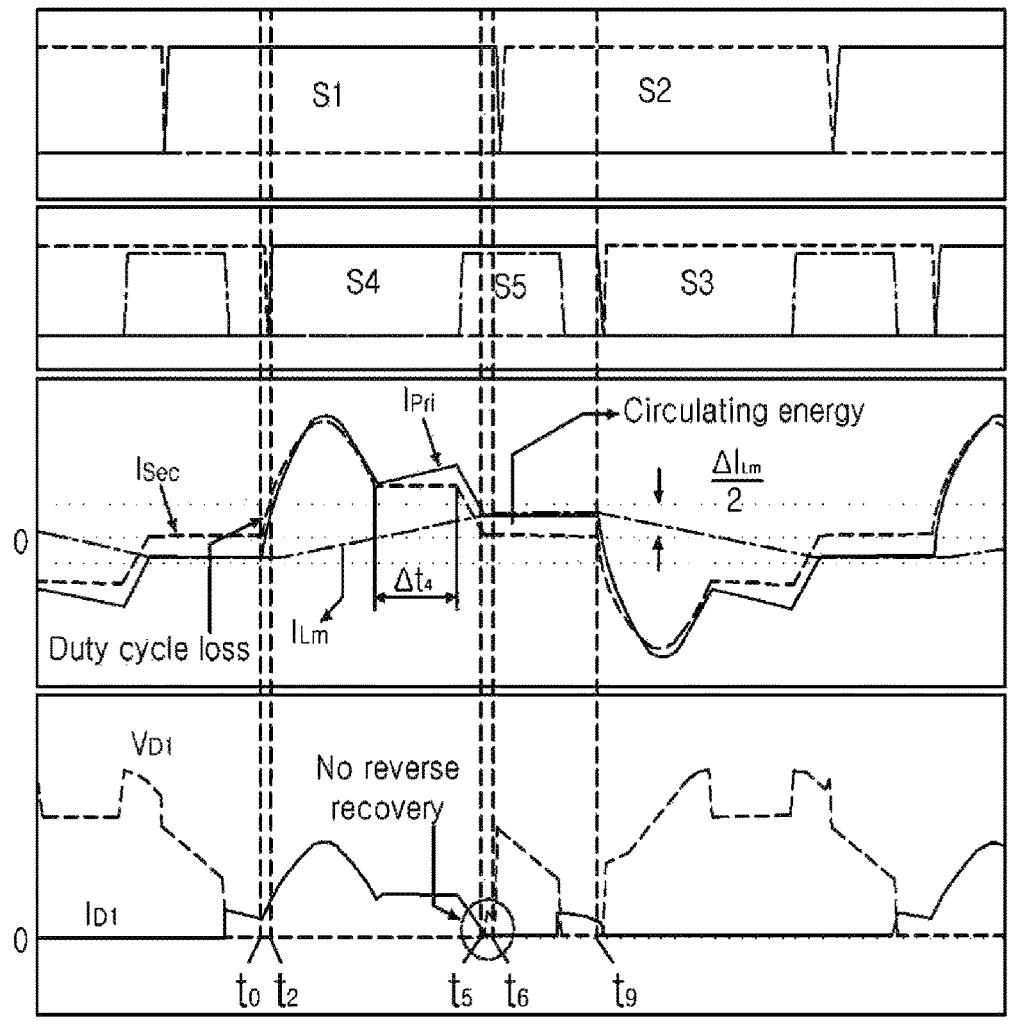
FIG. 8 is a diagram showing a waveform of each element of the active clamp full bridge converter according to an embodiment of the present disclosure.

FIG. 4 is an equivalent circuit diagram of the active clamp full bridge converter according to an embodiment of the present disclosure in each operation mode depicted in FIGS. 3A to 3J, FIG. 5 is a diagram simply showing the active clamp full bridge converter according to an embodiment of the present disclosure, FIGS. 6 and 7 are graphs showing examples of calculating a voltage gain of the active clamp full bridge converter according to an embodiment of the present disclosure, and FIG. 8 is a diagram showing a waveform of each element of the active clamp full bridge converter according to an embodiment of the present disclosure.

First, in FIGS. 4 and 5, $nV_s$ represents a secondary voltage of the transformer 110, and $D_m$ may have the same characteristics as the rectifying diode pair depicted in FIG. 2, namely the first diode $D_1$ and the fourth diode $D_4$ or the second diode $D_2$ and the third diode $D_3$, to operate identically. In addition, $S_m$ may play the role of the first switch 121 to the fourth switch 124 provided at the primary circuit 120. In addition, $L_f$ may be processed as a predetermined current sink $I_o$.

According to a model of the active clamp full bridge converter 100 according to an embodiment of the present disclosure, which is simplified as above, it may be found that the active clamp full bridge converter 100 according to an embodiment of the present disclosure is a quasi-resonant half-wave converter, because the secondary current $I_{sec}$ flows only in a forward direction. In addition, the active clamp full bridge converter 100 according to an embodiment of the present disclosure may be regarded as a hybrid converter of a PWM converter and a resonance converter. Thus, the DC gain may be calculated as a combination of the resonance converter and the PWM converter.

Specifically, first, in order to calculate the DC gain of the active clamp full bridge converter 100 according to an embodiment of the present disclosure, the region between the zeroth operation mode and the first operation mode and the region between the fifth operation mode and the seventh operation mode may be ignored because they occupy very short portions corresponding to the switching cycle $T_s$. Accordingly, the zeroth operation mode to the ninth operation mode may be briefly simplified to 6 operation modes, and an equivalent circuit of each operation mode is shown in FIG. 4. At this time, assuming that the energy $W_s$ supplied from the input source is equal to the energy $W_o$ absorbed by the load in one switching cycle, the DC gain of the active clamp full bridge converter 100 according to an embodiment of the present disclosure may be expressed as in Equation 22 below.

$$M = \frac{V_o}{nV_s} = \quad \text{[Equation 22]}$$
$$\frac{1}{\pi}F\left[\frac{\rho}{2} + \pi + \sin^{-1}(\rho) + \frac{1}{\rho}\left(1 + \sqrt{1-\rho^2}\right)\right] + \frac{\Delta t_4}{T_s/2}$$
$$\text{Where } F = f_s/f_r, \rho = \frac{I_o Z_r}{\Delta V_{Cr}} \text{ and } \Delta t_4 = t_4 - t_3.$$

In Equation 22, $I_o$ represents a reflected output current, $Z_r$ represents characteristic impedance, $V_{Cr}$ represents a voltage applied to the clamping capacitor 132, and $T_s$ represents a switching cycle.

Equation 22 may be an implicit function of a load (via $\rho$), a switching frequency (via F) and an effective duty cycle (via $\Delta t_4$). At this time, if $\Delta t_4$ is constant, the function M of Equation 22 may be expressed as in FIG. 6. Here, in the case of $\rho > 1$, it is impossible to obtain the zero current switching, and thus it is set to be $\rho < 1$. Referring to FIG. 6, it may be found that the voltage gain is less dependent on the load in the case of $0.7 < \rho < 1$.

In addition, referring to FIG. 7, the voltage gain M may be scaled according to F, and this means that when the frequency increase, the voltage gain also increases. At this time, if the resonance frequency $f_r$ and the switching frequency $f_s$ are fixed, it may be found that the voltage gain is changed according to $\Delta t_4$ that represents an effective duty cycle D. According to Equation 22, the maximum switching frequency may be determined based on $\Delta t_4=0$.

Meanwhile, referring to FIG. 8, in the zeroth operation mode and the sixth operation mode that are operation modes before the second switch 122 provided at the leading leg, namely the first leg, or the fourth switch 124 provided at the lagging leg, namely at the second leg, is turned on, it may be found that the primary current $I_{pri}$ becomes equal to the magnetizing current $I_{Lm}$. At this time, if the energy for sufficiently discharging the parasitic capacitance $C_{oss}$ of the switch elements of the primary circuit 120 and the parasitic capacitance of the transformer 110 is stored in the magnetizing inductor 126, the zero voltage switching turn-on condition of the switch elements of the primary circuit 120 may be satisfied regardless of the load condition.

$$\frac{1}{2}L_m\left(\frac{\Delta I_{Lm}}{2}\right)^2 = \frac{1}{2}L_m\left(\frac{DV_s}{4L_m f_s}\right)^2 > \frac{4}{3}C_{oss}V_s^2 \qquad \text{[Equation 23]}$$

In Equation 23, $\Delta I_{Lm}$ represents a peak-to-peak value of the magnetizing current $I_{Lm}$, $C_{oss}$ represents output capacitance of the primary switch elements, and $L_m$ is inductance of the magnetizing inductor 126, which may be calculated from Equation 24 below.

$$L_m < \frac{3D_{min}^2}{128 C_{oss} f_s^2} \qquad \text{[Equation 24]}$$

In Equation 24, $D_{min}$ represents a minimum effective duty value according to the minimum output voltage.

In addition, referring to FIG. 8, it may be found that a suitable zero current switching time for the elements of the primary switch is a time in the region where the transformer primary current $I_{pri}$ decreases to the magnitude of the magnetizing current $I_{Lm}$. In this region, it may also be found that the transformer secondary current $I_{Sec}$ is reset to 0 ($t_5$). At this time, the secondary current $I_{Sec}$ of the transformer in the fifth operation mode may be expressed as in Equations 25 and 26 below.

$$I_{Sec}(t) = I_o - \frac{nV_s - V_{Cr}(t_5)}{Z_r}\sin[\omega_r(t - t_4)] \qquad \text{[Equation 25]}$$

At $t = t_5$, $I_{Sec}(t_5) = 0$ $$\Delta t_5 = T_{ZCS} = \frac{1}{\omega_r}\left[\sin^{-1}\left(\frac{I_o Z_r}{nV_s - V_{Cr}(t_5)}\right)\right] \qquad \text{[Equation 26]}$$

In Equations 25 and 26, $I_o$ represents a reflected output current, n represents a turn ratio of the transformer, $V_s$ represents an input voltage, $V_{Cr}$ represents a voltage applied to the clamping capacitor 132, $Z_r$ represents characteristic impedance, and $\omega_r$ represents a resonant angular frequency.

According to Equation 26, the reflected output current $I_o$ should have a sufficiently great value to satisfy the condition of $I_o Z_r < nV_s - V_{Cr}(t_5)$. If not, the secondary current $I_{Sec}$ may be reset to 0.

In addition, referring to FIG. 8, it may be found that in the interval of $t_6$ to $t_9$, only a small magnetizing current $I_{Lm}$ is freewheeling at the primary side of the transformer 110. Thus, the conduction loss in the freewheeling region may be minimized, and particularly high efficiency is ensured under a low weight condition.

In addition, referring to FIG. 8, in the fifth operation mode ($t_5$ to $t_6$), when the secondary current $I_{Sec}$ decreases to 0, the first diode $D_1$ and the fourth diode $D_4$ may be turned off without any reverse recovery problem. Thus, the loss caused by the reverse recovery problem may also be perfectly eliminated. Generally, the loss of the rectifying diodes caused by the reverse recovery problem gives a great influence on the efficiency of the converter. However, the active clamp full bridge converter 100 according to an embodiment of the present disclosure is able to eliminate the loss caused by the reverse recovery problem and thus may ensure high efficiency. Moreover, the voltage of the rectifying bridge is clamped to a maximum voltage of the clamping capacitor 132, and thus the voltage ringing problem may also be eliminated.

In addition, referring to FIG. 8, at the commutation interval of $t_0$ to $t_1$, it may be found that the primary current $I_{pri}$ increases from almost 0 to the magnitude of the reflected output current. At this time, by minimizing the leakage inductance, the duty cycle loss may be minimized, thereby accomplishing the maximum efficiency.

Hereinafter, the advantageous effect of the active clamp full bridge converter 100 according to an embodiment of the present disclosure will be verified with reference to FIGS. 9A to 11.

Figure 9A:
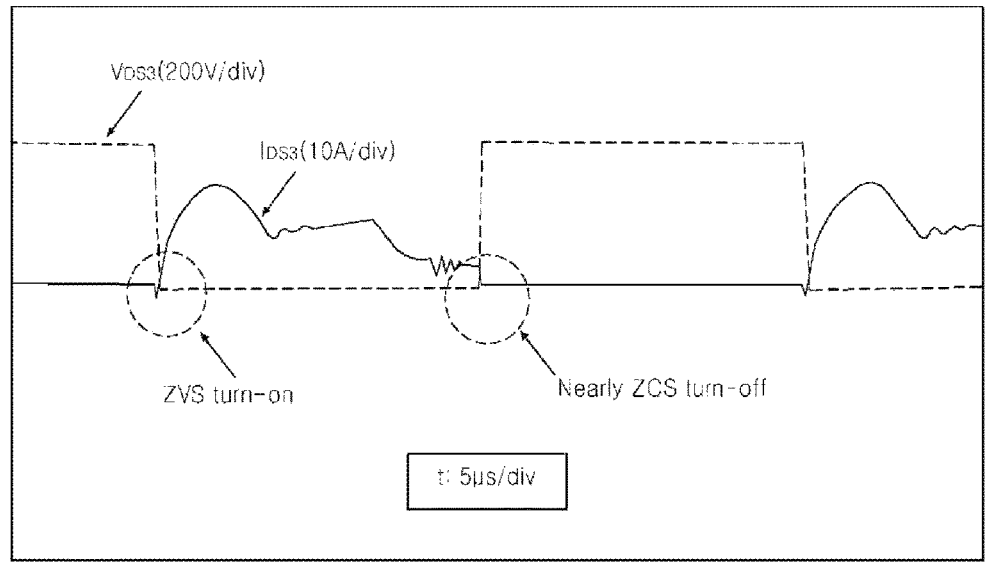
FIGS. 9A to 9F are graphs showing output waveforms when the active clamp full bridge converter according to an embodiment of the present disclosure is under an output current condition of 3 kW.
Figure 9B:
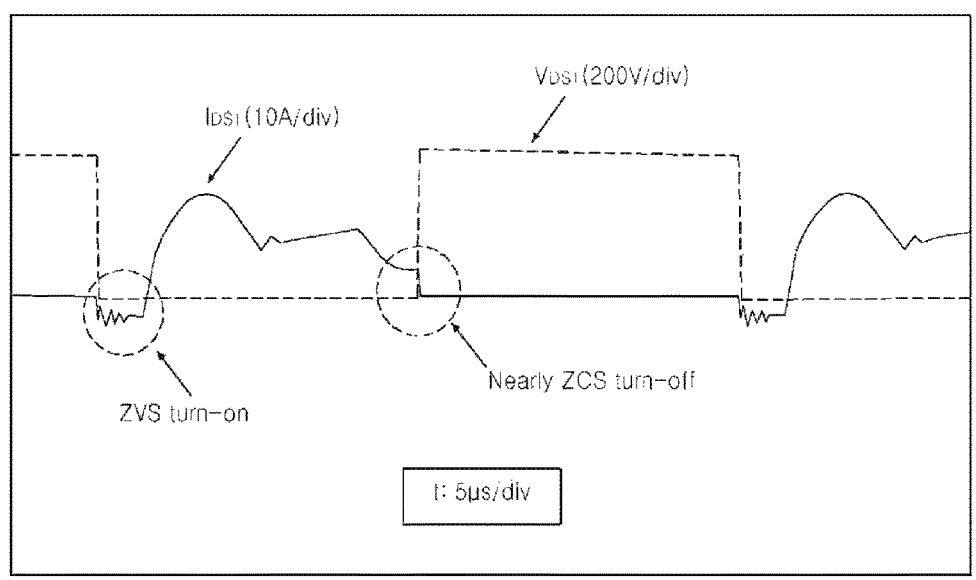
Figure 9C:
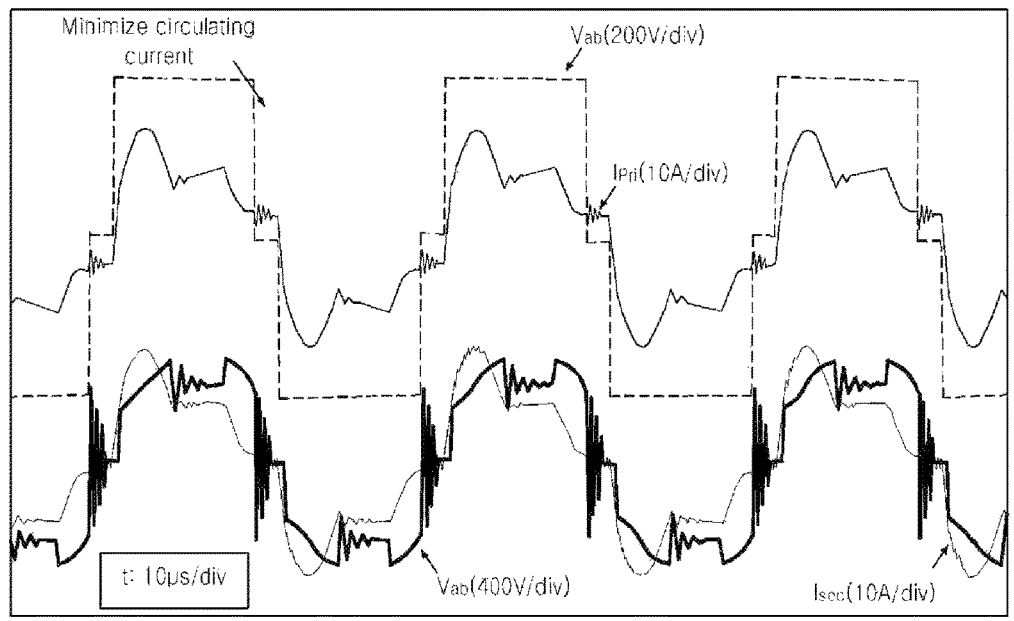
Figure 9D:
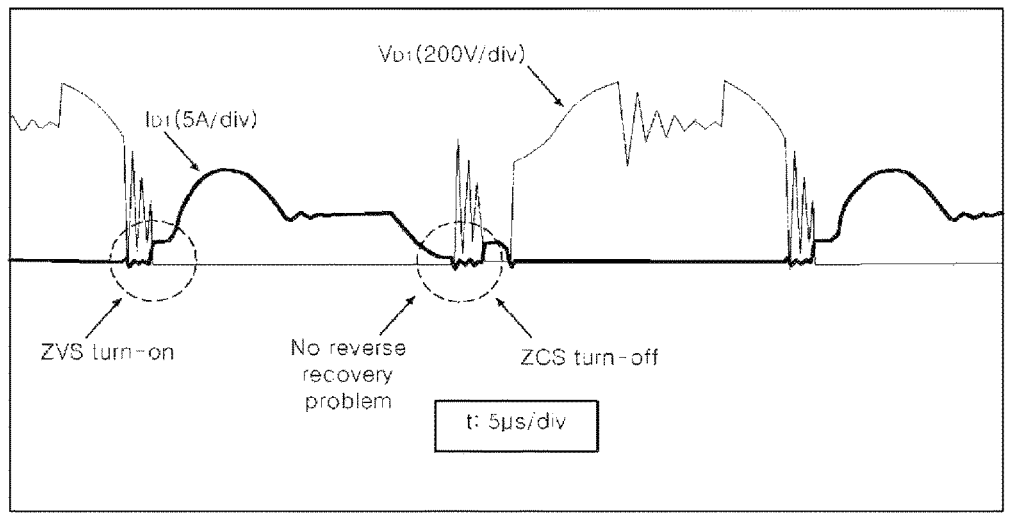
Figure 9E:
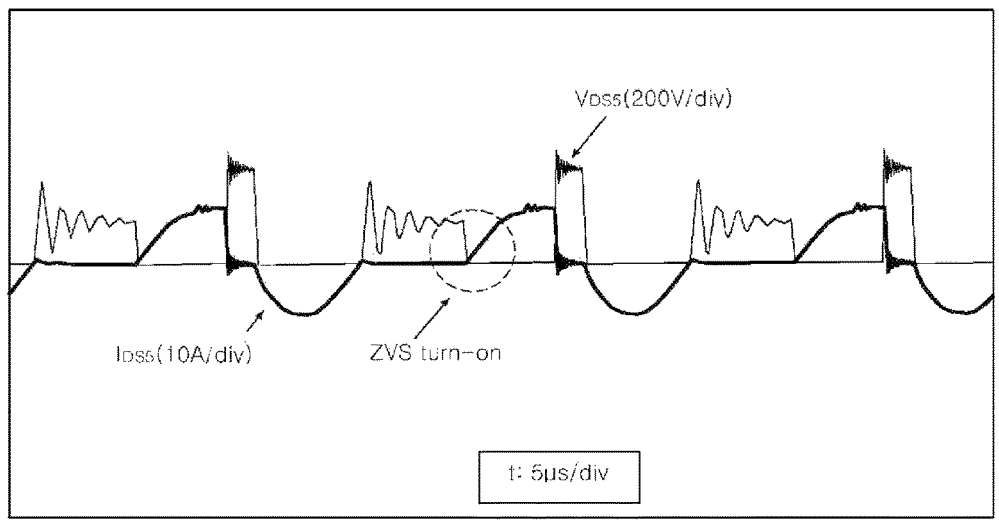
Figure 9F:
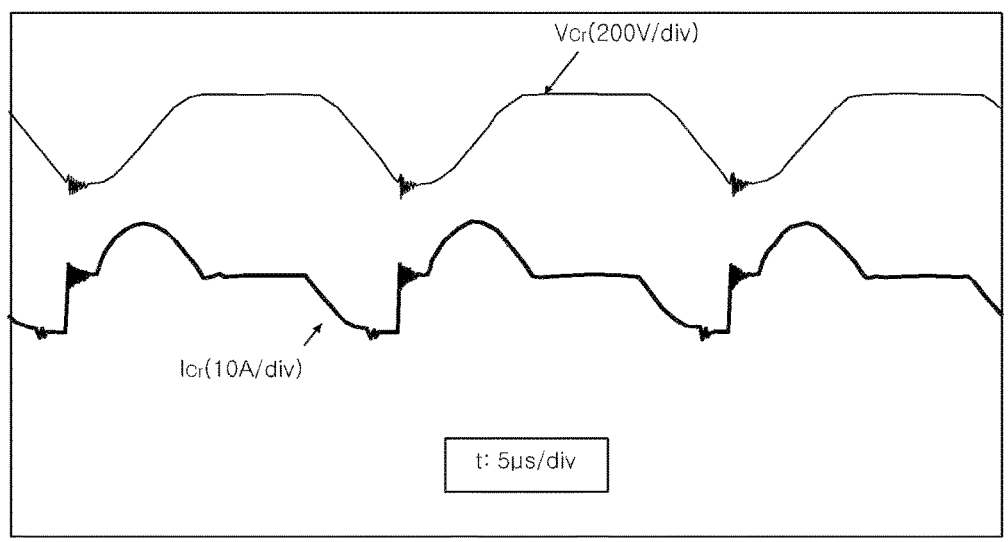
Figure 10A:
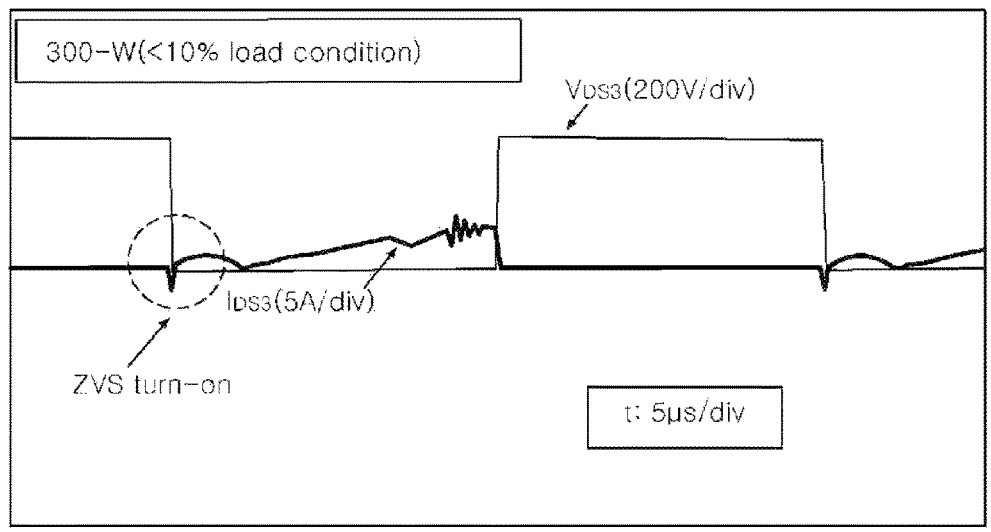
FIGS. 10A to 10C are graphs showing output waveforms when the active clamp full bridge converter according to an embodiment of the present disclosure is under an output voltage condition of 250 V.
Figure 10B:
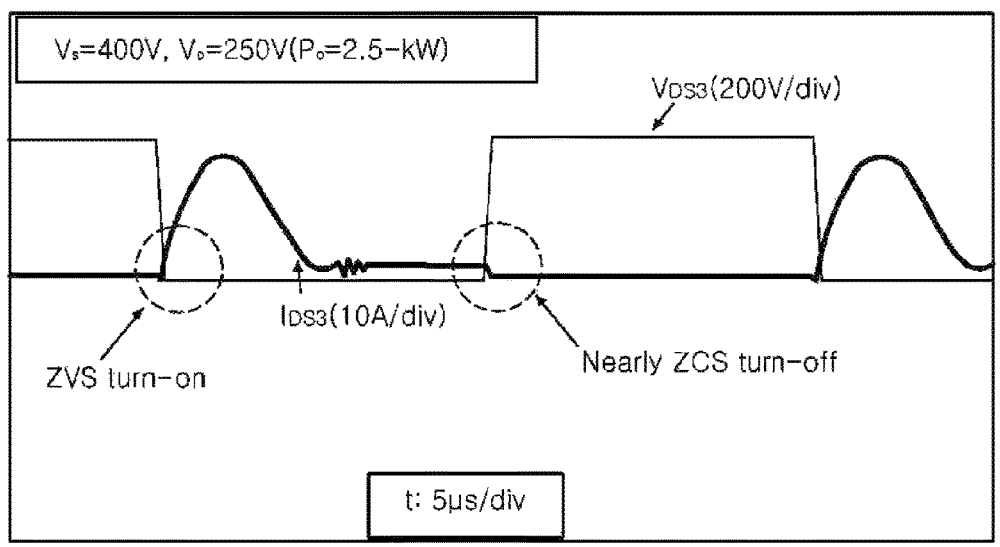
Figure 10C:
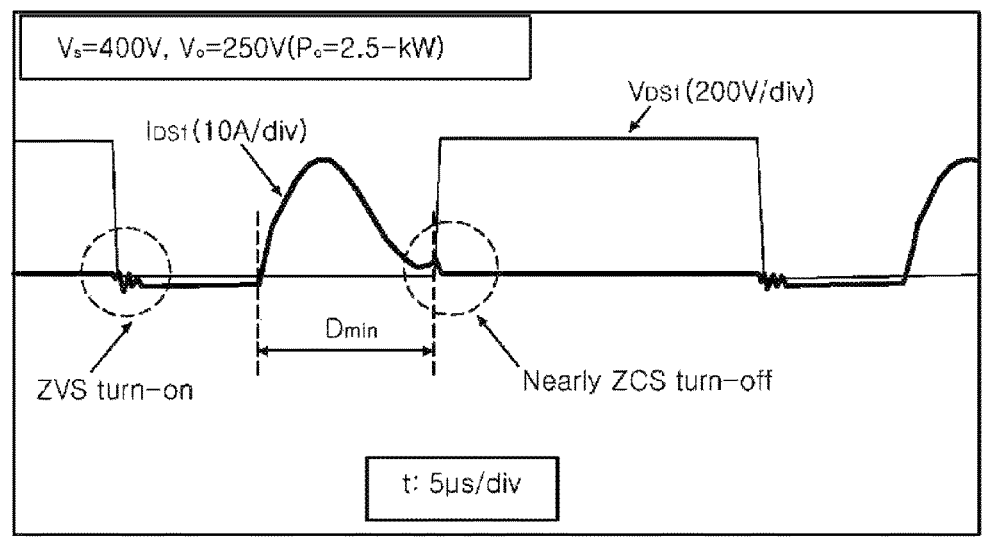
Figure 11:
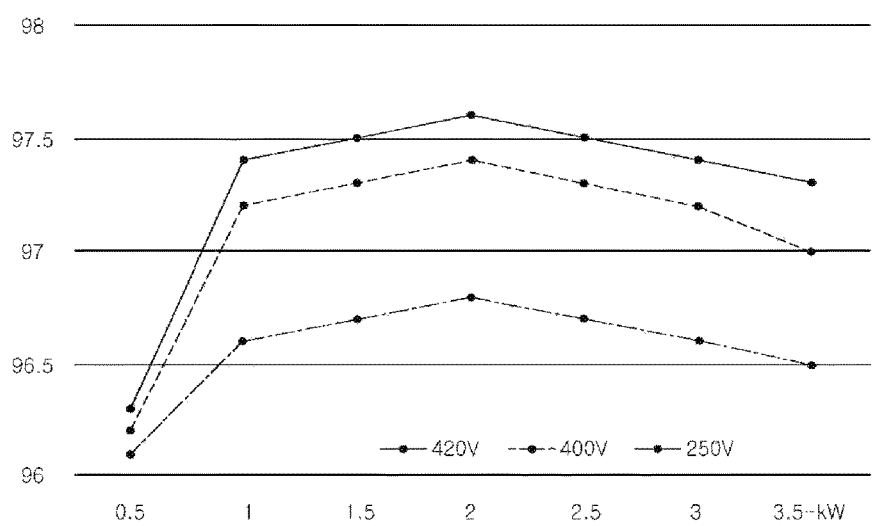
FIG. 11 is a graph showing efficiency when the active clamp full bridge converter according to an embodiment of the present disclosure is under different output voltage conditions.

FIGS. 9A to 9F are graphs showing output waveforms when the active clamp full bridge converter according to an embodiment of the present disclosure is under an output current condition of 3 kW, FIGS. 10A to 10C are graphs showing output waveforms when the active clamp full bridge converter according to an embodiment of the present disclosure is under an output voltage condition of 250 V, and FIG. 11 is a graph showing efficiency when the active clamp full bridge converter according to an embodiment of the present disclosure is under different output voltage conditions.

First, in order to check the operation characteristics of the active clamp full bridge converter 100 according to an embodiment of the present disclosure and to verify its effect, a converter having the specifications and conditions as shown in Tables 1 to 3 below is designed.

TABLE 1

| Parameter | Designator | Value |
| --- | --- | --- |
| Input Voltage Nominal | $V_s$ | 380 [V] |
| Output Voltage Range | $V_o$ | 250-420 [V] |
| Maximum Output Power | $P_{o,max}$ | 3.5 [kW] |
| Switching frequency | $f_s$ | 30 [kHz] |
| Resonant frequency | $f_0$ | 100 [kHz] |

TABLE 2

| Parameter (Designator) | Measured Value |
| --- | --- |
| Turn ratio of the transformer ($n_1:n_2$) | 11:13 |
| Magnetizing inductance ($L_m$) | 828 [μH] |
| Leakage inductance ($L_{lk}$) | 20 [μH] |
| Clamping capacitor ($C_r$) | 112 [nF] |
| Filter output inductor ($L_f$) | 360 [μH] |

TABLE 3

| Component | Manufacturer | Part # |
| --- | --- | --- |
| Primary side switch ($S_1$~$S_4$) | Infineon | IPW60R041C6 |
| Active clamp switch ($S_5$) | Fairchild | FCH76N60N |
| Rectifier diodes ($D_1$~$D_4$) | Vishay | HFA50PA60 |

Referring to FIGS. 9A and 9B, it may be found that under the output power condition of 3 kW, the first switch 121 to the fourth switch 124 provided at the leading leg and the lagging leg of the primary circuit 120 all perform a turn-on operation under a zero voltage switching condition and perform a turn-off operation under an almost zero current switching condition.

In addition, referring to FIG. 9C, the voltage and current of each of the primary and secondary sides of the transformer 110 may be determined, and it may be found that only a small magnetizing current flows through the primary side of the transformer 110 in the freewheeling region. Accordingly, the conduction loss by the circulating current is almost zero.

In addition, referring to FIG. 9D, the waveforms of the voltage and current applied to the first diode $D_1$, which is provided at the secondary circuit 130 and performs the rectifying operation, may be checked, and it may be found that the voltage ringing of the rectifier is completely clamped to 580 V. In addition, since the slope of $ID_1$ is not stiff before the first diode $D_1$ is biased in a reverse direction, the reverse recovery current may be removed. As described above, an embodiment of the present disclosure, the active clamp full bridge converter 100 according to an embodiment of the present disclosure may solve the reverse recovery problem of the rectifying diodes.

In addition, referring to FIG. 9E, the waveform of the active clamp switch 131 provided at the secondary circuit 130 may be checked. The active clamp switch 131 may accomplish a zero current switching turn-on condition by the resonance between the leakage inductance $L_{lk}$ of the transformer 110 and the clamping capacitor 132.

In addition, referring to FIG. 9F, the waveform of the clamping capacitor 132 provided at the secondary circuit 130 may be checked. The voltage $V_{Cr}$ of the clamping capacitor 132 has a peak value when the charge current $I_{Cr}$ decreases to 0, and after that, the voltage $V_{Cr}$ may maintain the value and then be discharged when the active clamp switch 131 is turned on.

In addition, referring to FIG. 10A, it may be found that the zero voltage switching turn-on of the switch elements provided at the leading leg and the lagging leg of the primary circuit 120 may be accomplished under a load condition of 10%. This is because the inductive energy stored in the magnetizing inductor $L_m$ is sufficient to discharge the output capacitors of the switch elements. That is, it is proved that the zero voltage switching turn-on condition is independent of the change in load.

In addition, referring to FIGS. 10B and 10C, it may be found that the switch element of the leading leg performs a zero current switching turn-off operation under an input voltage of 400 V, an output voltage of 250 V and a load of 2 kW. When the output current has a minimum value (250 V) as described above, the time of the fourth operation mode decreases to 0, and accordingly, the active clamp full bridge converter according to an embodiment of the present disclosure operates as a zero current switching quasi-resonant converter. At this time, the primary current $I_{pri}$ may be equal to the magnetizing current $I_{Lm}$ before the switch element of the leading leg is turned off.

In addition, referring to FIG. 11, the efficiency at the input voltage of 380 V and different output voltage conditions of 250 V, 400 V, 420 V may be checked. When the output voltage is 420 V, it may be found that the maximum efficiency is 97.6% under the load condition of 2 kW, and it may also be found that the efficiency is relatively high (>96%) even under a low weight load condition.

While the present disclosure has been described with reference to the embodiments, it will be understood by those skilled in the art that various changes and modifications may be made without departing from the scope of the present disclosure as set forth in the appended claims.

The invention claimed is:

1. An active clamp full-bridge converter, comprising:
a transformer having a primary coil and a secondary coil, the transformer converting a voltage;
a primary circuit connected to an input capacitor supplying an input power, the primary circuit comprising a full-bridge circuit having a first switch, a second switch, a third switch, and a fourth switch, wherein the first to fourth switches transmit the input power to the primary coil according to a switching operation of the first to fourth switches; and
a secondary circuit connected to the secondary coil, the secondary circuit comprising:
a rectifying bridge circuit having a first diode, a second diode, a third diode, and a fourth diode,
an active clamp circuit connected to the rectifying bridge circuit, the active clamp circuit having an active clamp switch and a clamping capacitor, wherein the active clamp switch and the clamping capacitor are connected in series, and
an output inductor connected to the active clamp circuit, wherein the secondary circuit transmits an energy received from the primary circuit by the transformer to an output capacitor connected to the output inductor and the active clamp circuit
wherein the active clamp full-bridge converter operates in plurality of operation modes, and the plurality of operation modes include an operation mode that two switches provided on a diagonal line of the full-bridge circuit among the first to fourth switches and the active clamp switch operate turn-on condition.

2. The active clamp full-bridge converter of claim 1, wherein the clamping capacitor performs resonance between the active clamp switch and a leakage inductance of the transformer.

3. The active clamp full-bridge converter of claim 2, wherein in the secondary circuit, the first to fourth diodes are coupled to a pair of legs in parallel, an upper contact point of the pair of legs is coupled to one end of the active clamp switch, anther end of the active clamp switch is coupled to one end of the clamping capacitor, and another end the clamping capacitor is coupled to a lower contact point of the pair of legs.

4. The active clamp full-bridge converter of claim 1, wherein the secondary circuit includes the active clamp switch which operates a turn-on operation and delays the resonance between the clamping capacitor and a leakage inductance of the transformer for a predetermined period.

5. The active clamp full-bridge converter of claim 1, wherein the secondary circuit includes the active clamp switch which operates a turn-on operation and resets a primary current output from the primary circuit in a freewheeling region.

6. The active clamp full-bridge converter of claim 1, wherein a primary current output from the primary circuit outputs a quasi-sinusoidal waveform.

7. The active clamp full-bridge converter of claim 1, wherein the primary circuit includes a first leg and a second leg connected in parallel, the first to fourth switches are coupled to the first leg and the second leg, a leakage inductor and a magnetizing inductor are provided on an input voltage line connecting the first leg and the second leg, and the magnetizing inductor is connected to the primary coil in parallel.

8. The active clamp full-bridge converter of claim 1, wherein in the secondary circuit, when the active clamp switch is turned on, the energy stored in the clamping capacitor is discharged to the output capacitor through the active clamp switch.

9. A driving method of an active clamp full-bridge converter, which converts a voltage between an input capacitor supplying an input power and an output capacitor connected to an output load resistor in parallel, the active clamp full-bridge converter comprising:
a primary circuit connected to the input capacitor including a full-bridge circuit having a first switch, a second switch, a third switch, and a fourth switch; and
a secondary circuit connected to the output capacitor, the secondary circuit comprising:
a rectifying bridge circuit having a first diode, a second diode, a third diode, and a fourth diode,
an active clamp circuit connected to the rectifying bridge circuit, the active clamp circuit having an active clamp switch and a clamping capacitor, wherein the active clamp switch and the clamping capacitor are connected in series, and
an output inductor connected to the active clamp circuit, a transformer being provided between the primary circuit and the secondary circuit to convert the voltage,
the driving method of an active clamp full-bridge operating in plurality of operation modes comprising:
controlling the first switch and the second switch coupled to at a same leg of the full-bridge circuit to turn on or turn off contrary to one another according to the plurality of operation modes;
controlling the third switch and the fourth switch to turn on or turn off contrary to one another to transmit the input power to the transformer according to the plurality of operation modes;
when a zero current switching turn-on condition is accomplished in a state all switches provided on a diagonal line of the full-bridge circuit are turned on, controlling the active clamp switch to turn on; and
transmitting the energy stored in the clamping capacitor to the output capacitor,
wherein the plurality of operation modes includes an operation mode that two switches provided on a diagonal line of the full-bridge circuit among the first to fourth switches and the active clamp switch operate turn-on condition.

10. The driving method of an active clamp full-bridge converter of claim 9, wherein before a switching cycle of the first to fourth switches and the active clamp switch starts, in the secondary circuit, the first to fourth diodes operate to form a conduction path for a reflection current of the output inductor.

11. The driving method of an active clamp full-bridge converter of claim 10, wherein the switching cycle includes a dead time that satisfies a predetermined condition for accomplishing a soft switching condition of the first to fourth switches.

12. The driving method of an active clamp full-bridge converter of claim 11, wherein the first to fourth switches perform a turn-on operation under a zero voltage switching condition.

13. The driving method of an active clamp full-bridge converter of claim 11, wherein the first to fourth switches perform a turn-off operation under a zero current switching condition.

14. The driving method of an active clamp full-bridge converter of claim 9, wherein when the first diode and the fourth diode are biased in a forward direction, the resonance between a leakage inductance of the transformer and the clamping capacitor starts.

15. The driving method of an active clamp full-bridge converter of claim 9, wherein when the clamping capacitor is charged to a maximum value, a rectifying voltage of the rectifying bridge circuit is clamped by the maximum voltage of the clamping capacitor.

* * * * *